(12) United States Patent
Masuda

(10) Patent No.: US 8,515,504 B2
(45) Date of Patent: Aug. 20, 2013

(54) PORTABLE TERMINAL WITH ROTATING DISPLAY

(75) Inventor: Takefumi Masuda, Kanagawa (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 1204 days.

(21) Appl. No.: 11/835,729

(22) Filed: Aug. 8, 2007

(65) Prior Publication Data

US 2008/0056485 A1    Mar. 6, 2008

(30) Foreign Application Priority Data

Sep. 6, 2006 (JP) ................................. 2006-241885

(51) Int. Cl.
*H04M 1/00* (2006.01)
(52) U.S. Cl.
USPC .... 455/575.3; 455/90.3; 455/566; 361/679.3; 361/679.27
(58) Field of Classification Search
USPC ................... 455/575.3, 575.1, 575.2
See application file for complete search history.

(56) References Cited

U.S. PATENT DOCUMENTS 7,546,152 B2 * 6/2009 Christensen ............... 455/575.3
2006/0211457 A1 * 9/2006 Otsuka ........................ 455/575.1

FOREIGN PATENT DOCUMENTS

| EP | 1 298 890 A2 | 4/2003 |
| EP | 1 610 530 A1 | 12/2005 |
| JP | 2002-171189 | 6/2002 |
| JP | 2004-120513 | 4/2004 |

* cited by examiner

*Primary Examiner* — Rafael Perez-Gutierrez
*Assistant Examiner* — German Viana Di Prisco
(74) *Attorney, Agent, or Firm* — Oblon, Spivak, McClelland, Maier & Neustadt, L.L.P.

(57) ABSTRACT

Disclosed is a portable terminal including a first enclosure having a display unit; a second enclosure having an operation unit; a first connection unit foldably connecting the first enclosure to the second enclosure by being rotated around a first center axis; and a second connection unit connecting the first enclosure to the second enclosure and allowing the first enclosure to be rotated between a first position and a second position and around a second center axis perpendicular to the first center axis, the second center axis located in a position shifted by a predetermined amount from a center of the first enclosure. The first enclosure is displaced from the second enclosure corresponding to the second center axis when the enclosures are folded via the first connection unit in a state where the first enclosure is rotated to the second position in the second connection unit.

5 Claims, 8 Drawing Sheets

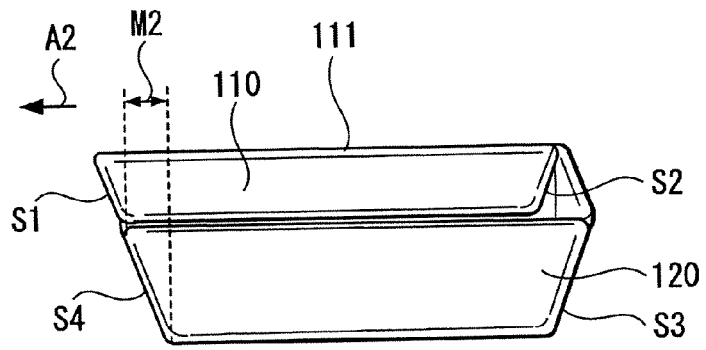
FIG. 6A
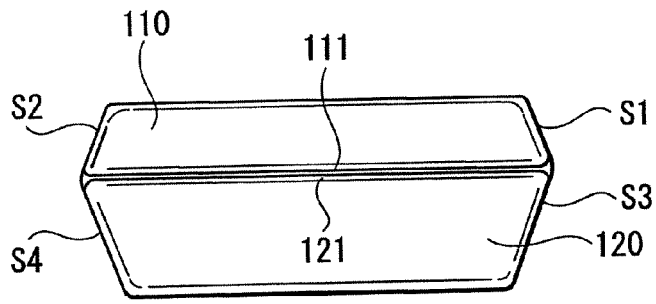
FIG. 6B
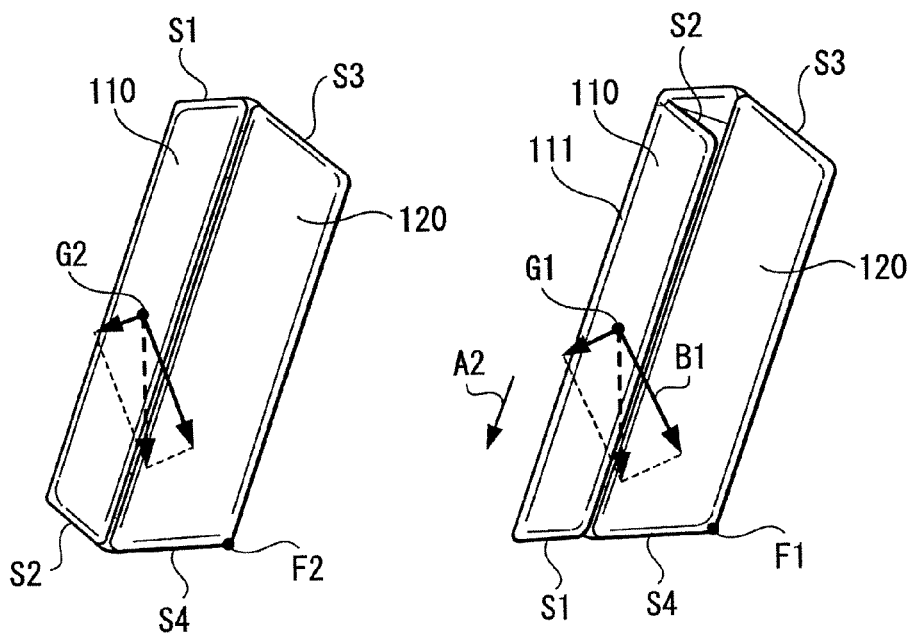
FIG. 7A
FIG. 7B

PORTABLE TERMINAL WITH ROTATING DISPLAY

CROSS REFERENCES TO RELATED APPLICATIONS

The present invention contains subject matter related to Japanese Patent Application JP 2006-241885 filed in the Japanese Patent Office on Sep. 6, 2006, the entire contents of which being incorporated herein by reference.

BACKGROUND OF THE INVENTION

1. Field of the Invention

The present invention relates to a portable terminal suitably used as a portable telephone terminal, for example. More particularly, the present invention relates to a portable terminal used as a portable telephone terminal having two enclosures connected to each other via a mechanism called a biaxial hinge.

2. Description of the Related Art

In recent years, there have been an increased number of portable telephone terminals that include a first enclosure having an operation unit and a second enclosure having a display unit, both of which are foldably connected via a biaxial hinge with two rotation axes located perpendicular to each other. Further, portable telephone terminals capable of receiving television broadcasts have now been widely used, and hence an increased number of portable telephone terminals having the aforementioned shape can receive television broadcasts. Many of portable telephone terminals having such a shape include a first enclosure and a second enclosure foldable with a display unit directed outward to display television broadcasts, in order to watch television broadcasts easily.

Japanese Unexamined Patent Application Publication No. 2002-171189 discloses a portable terminal including a first enclosure and a second enclosure foldable with a display unit directed to front.

SUMMARY OF THE INVENTION

When a user watches television broadcasts with a portable telephone terminal in a state where a first enclosure and a second enclosure are folded with a display unit directed outward, a user may watch the broadcasts at an easily viewable angle if a portable telephone terminal is held by his/her hand. However, when the user watches the broadcasts with the portable telephone terminal by placing the terminal on a desk, or the like, the user may have to lay the terminal parallel with a locating plane or raise the terminal perpendicular to the locating plane. Thus, the user may have to place the terminal on a specific stand to watch television broadcasts with the display unit adjusted at an easily viewable angle.

According to embodiments of the present invention, there is provided a portable terminal that may be placed in a plane of a desk, or the like, at an easily viewable angle and in a stable manner when a user watches television broadcasts with the portable terminal in a state where a first enclosure and a second enclosure are folded with a display unit directed outward.

According to an embodiment of the present invention, there is provided a portable terminal including a first enclosure having a display unit, a second enclosure having an operation unit, a first connection unit to allow the first enclosure and the second enclosure to be folded, and a second connection unit to allow the first enclosure to be rotated around a longitudinal center axis of the first enclosure. The rotation center of the second connection unit is shifted by a predetermined amount from a center of the first enclosure. Furthermore, the first enclosure overlaps the second enclosure in a state where the longitudinal center line of the first enclosure is displaced from a longitudinal center line of the second enclosure, when the first enclosure and the second enclosure are folded via the first connection unit with the display unit of the first enclosure directed outward.

According to an embodiment of the present invention, there is provided a portable terminal, where the first enclosure and the second enclosure have side surfaces inclined at a predetermined angle, and where one side surface of the first enclosure almost corresponds to one side surface of the second enclosure and the inclined side surfaces of the enclosures are located almost coplanar with each other when the first enclosure and the second enclosure are folded with the display unit of the first enclosure directed outward.

In arranging the portable terminal in this manner, when the first enclosure and the second enclosure are folded with the display unit of the first enclosure directed outward and one side inclined surface of the first enclosure and one side inclined surface of the second enclosure are placed on the bottom, the portable terminal is upright and slightly inclined with the display unit directed outward.

According to an embodiment of the present invention, a portable terminal may be located in a plane of a desk or the like at an easily viewable angle and in a stable manner when a user watches television broadcasts with the portable terminal in a state where a first enclosure and a second enclosure are folded with a display unit directed outward.

BRIEF DESCRIPTION OF THE DRAWINGS

FIG. 6 is a side view showing an example of a portable telephone terminal according to an embodiment of the present invention in a closed state.

FIG. 7 is a side view showing a locating example of a portable telephone terminal according to an embodiment of the present invention.

DESCRIPTION OF THE PREFERRED EMBODIMENTS

An embodiment of the present invention will be described below with reference to FIGS. 1 to 9.

Figure 2:
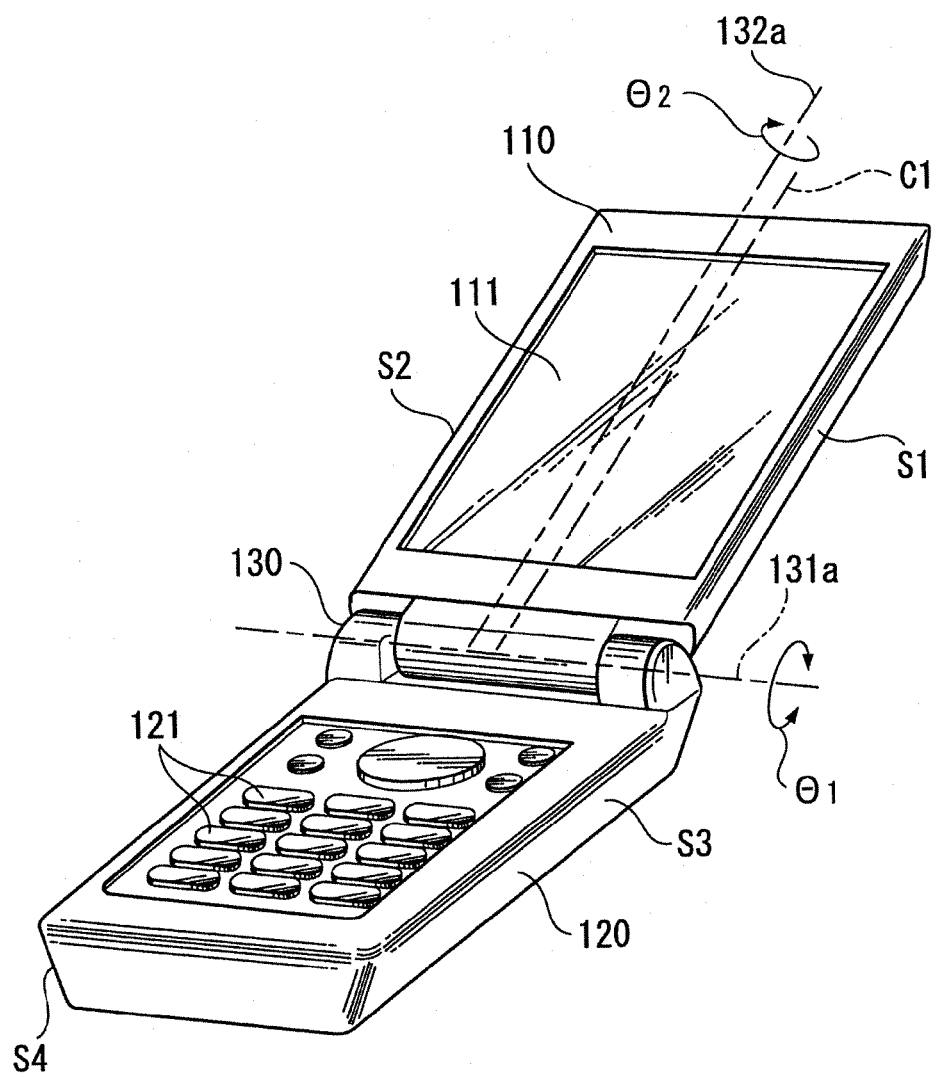
FIG. 2 is an oblique view showing an example of a portable telephone terminal according to an embodiment of the present invention in an open state.
Figure 3:
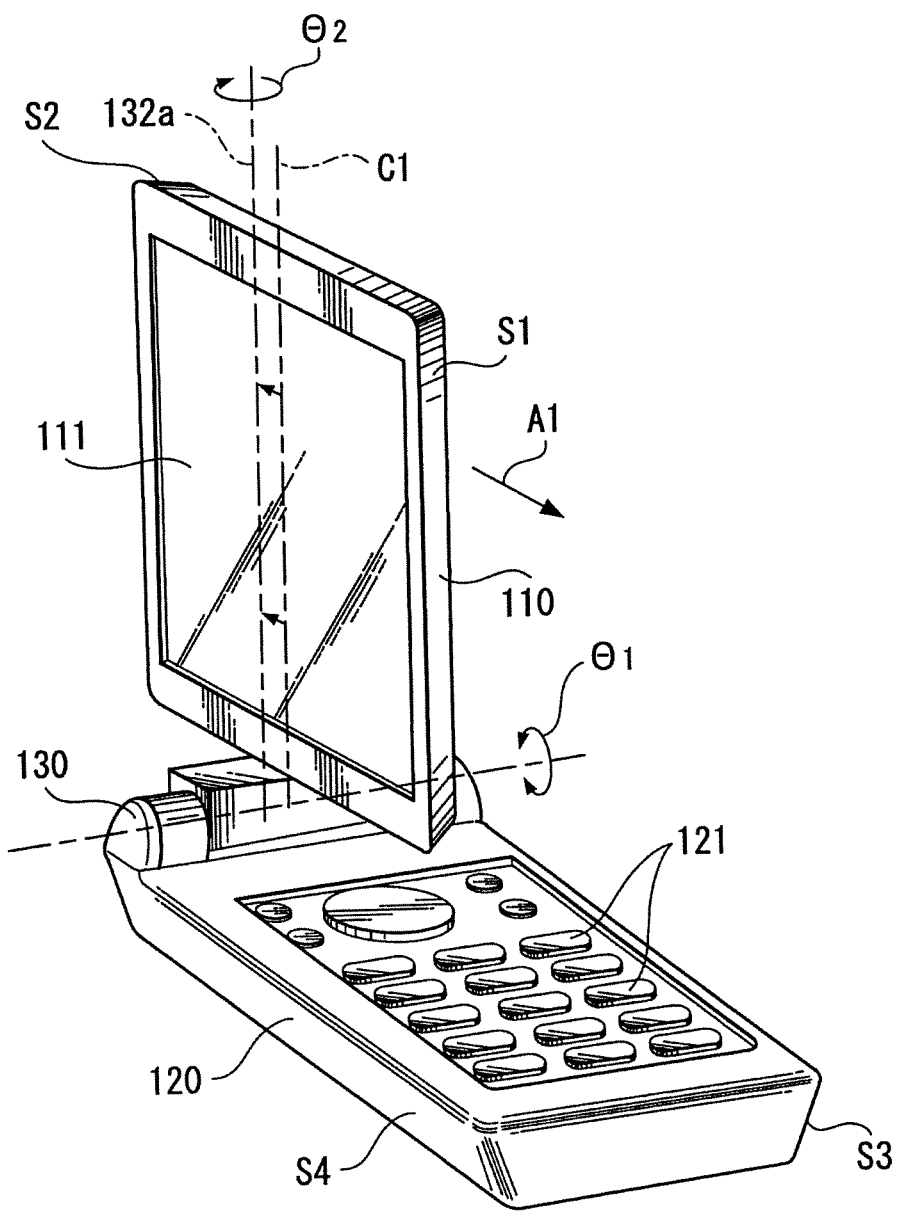
FIG. 3 is an oblique view showing an example of a rotation state of an enclosure of a portable telephone terminal according to an embodiment of the present invention.

In the present embodiment, a portable telephone terminal has a function to receive television broadcasts. First, a whole configuration of the portable telephone terminal of the present embodiment will be described with reference to FIGS. 1 to 3. The portable telephone terminal 100 of the present embodiment shown in FIGS. 1 to 3 is formed as a foldable portable telephone terminal. FIG. 1 shows a closed state, FIG. 2 shows an open state, and FIG. 3 shows a rotation state of an enclosure.

The portable telephone terminal 100 in an open state described with reference to FIG. 2 has a first enclosure 110 and a second enclosure 120 each having an elongated shape and rotatably connected to each other via a hinge 130. The hinge 130 is a biaxial hinge having a first rotation axis 131*a* around which the first enclosure 110 and the second enclosure 120 may be rotated in a rotational direction θ1 shown in FIG. 2, and a second rotation axis 132*a* around which the first enclosure 110 may be rotated in a rotational direction θ2. The first rotation axis 131*a* is at right angles to the second rotation axis 132*a*. In the present embodiment, the second rotation axis 132*a* is displaced outward from a center line C1 formed by uniting center points of a short side of the first enclosure 110. Details on a configuration of the hinge 130 will be described later.

Figure 8:
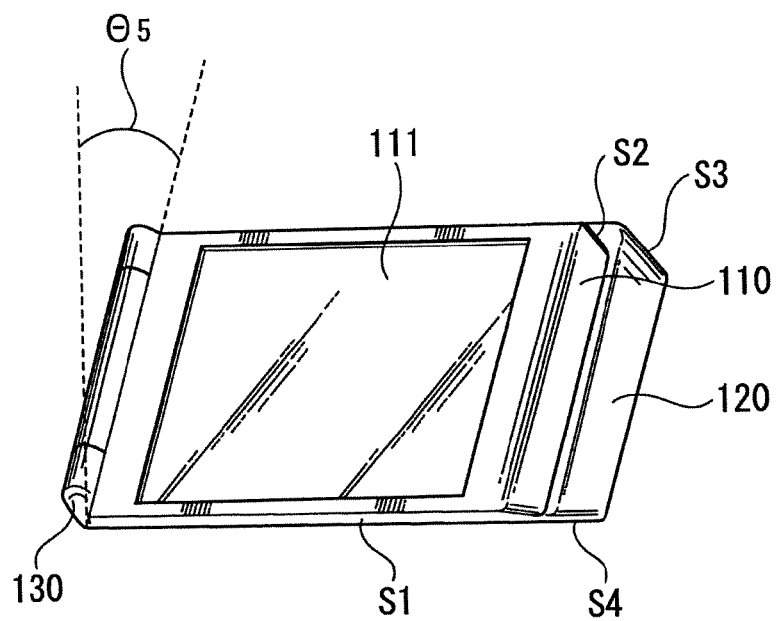
FIG. 8 is an oblique view showing a locating example of a portable telephone terminal according to an embodiment of the present invention.

In FIG. 2, a display unit 111 includes a liquid display panel, and the like, located in the first enclosure 110, and a speaker (not shown) is located at an upper end of the first enclosure 110. In the display unit 111, a telephone number is displayed when the portable telephone terminal 100 is used as a telephone; a mail text sent or received is displayed when the portable telephone terminal 100 is used as a mailer; and a television broadcast image is displayed when the portable telephone terminal 100 receives television broadcasts. A television broadcast image is vertically displayed in the display unit 111 with vertical as shown in FIG. 2 or horizontally displayed in the display unit 111 horizontally located as shown in FIG. 8.

An operation unit 121 includes numeric dialing keys and the like and various function keys located in the second enclosure 120; and a microphone (not shown) is located on a lower end of the second enclosure 120. Function keys prepared for the operation unit 121 include keys used for receiving television broadcasts such as a key to start receiving television broadcasts, a key to designate a channel, and a key to control audio data. Keys for receiving television broadcasts may be assigned to dialing keys or the like and commonly used when the portable telephone terminal 100 is used as a telephone or used for watching television broadcasts. Alternatively, such keys may be located on a surface differing from a surface with keys such as dialing keys.

Figure 1A:
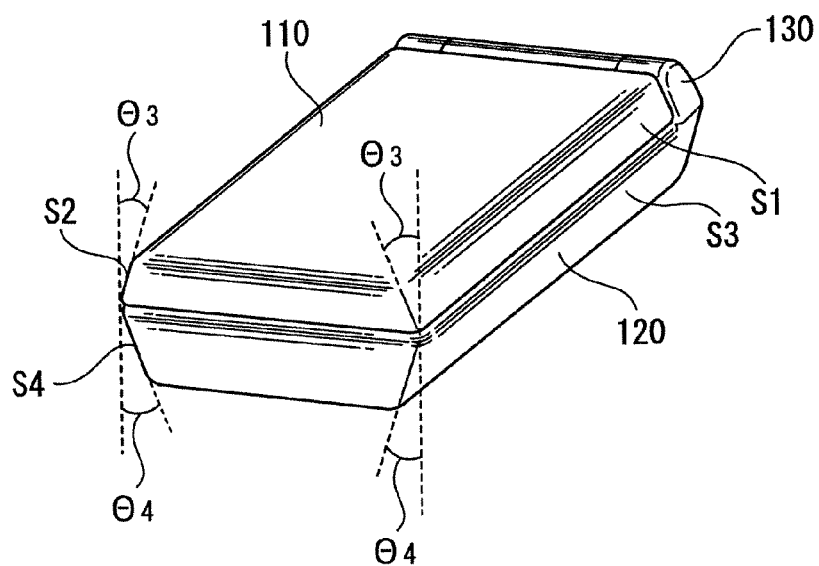
FIG. 1 is an oblique view showing an example of a portable telephone terminal according to an embodiment of the present invention in a closed state.

FIG. 1A is a view showing an example of the portable telephone terminal 100 of the present embodiment in a closed state. As shown in FIG. 1A, in a closed state, the display unit 111 provided in the first enclosure 110 shown in FIG. 2, the operation unit 121 provided in the second enclosure 120, and the like are stored inside. In the present embodiment, side surfaces S1 and S2 of the first enclosure 110 have an inclination shown as θ3, respectively, and side surfaces S3 and S4 of the second enclosure 120 have an inclination shown as θ4, respectively. θ3 and θ4 are an approximately identical angle such as 20°.

FIG. 3 is a view showing an example of a state where the first enclosure 110 is rotated via the hinge 130. The first enclosure 110 having the display unit 111 may be rotated around the rotation axis 132*a* of a second connection unit of the hinge 130 in the rotational direction of θ2. FIG. 3 shows a state where the first enclosure 110 is rotated at a predetermined angle around the rotation axis 132*a* in the θ2 direction. Since the second rotation axis 132*a* is provided as shifted outward from the center line C1 of the first enclosure 110 as described above, an axis of the first enclosure 110 rotated as shown in FIG. 3 is displaced in a direction indicated by an arrow A1 from an axis provided on the center line. The first enclosure 110 may be rotated at 180° around the rotation axis 132*a* of the hinge 130. When the first enclosure 110 rotated at 180° is inclined toward the second enclosure 120 around the rotation axis 131*a* of a first connection unit of the hinge 130, the first enclosure 110 and the second enclosure 120 may be closed with the display unit 111 directed outward.

Figure 1B:
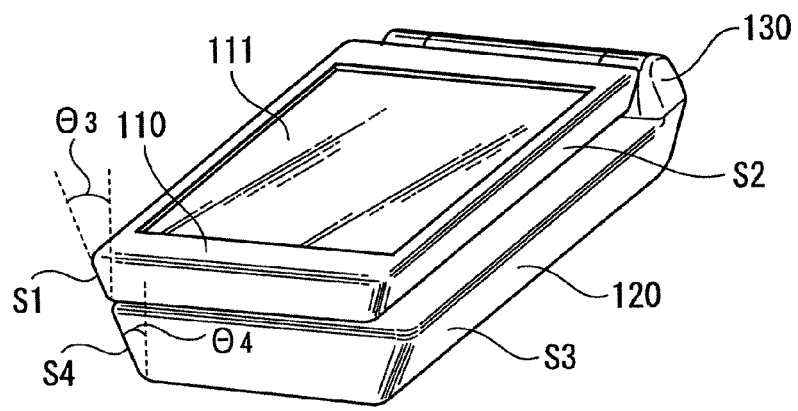

FIG. 1B shows an example in which the first enclosure 110 and the second enclosure 120 are folded in such a state. FIG. 1B shows a state where the first enclosure 110 and the second enclosure 120 are folded with the display unit 111 provided in the first enclosure 110 and directed outward. Details on a shape of the folded enclosures will be described later.

Figure 4:
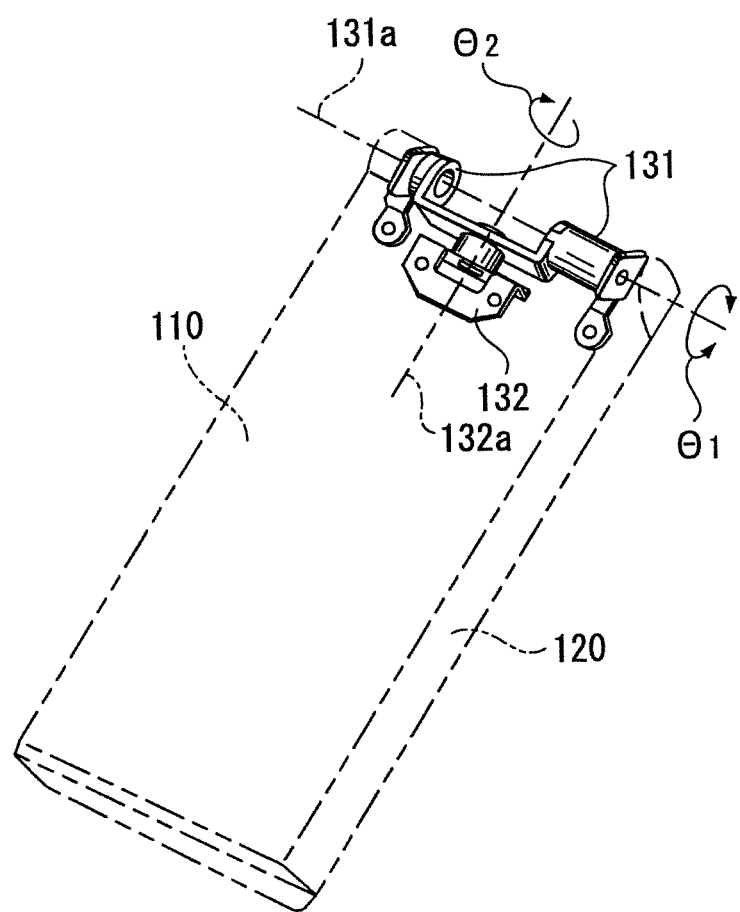
FIG. 4 is an oblique view showing a configuration example of a hinge according to an embodiment of the present invention.

Next, details on a configuration of the hinge 130 of the portable telephone terminal 100 of the present embodiment will be described with reference to FIGS. 4 and 5. FIG. 4 shows an example of a configuration of the hinge 130 to connect the first enclosure 110 to the second enclosure 120. In FIG. 4, the first connection unit 131 connects the first enclosure 110 to the second enclosure 120 so that the enclosures may be rotated around the rotation axis 131*a* in the θ1 direction. The second connection unit 132 connects the first enclosure 110 to the second enclosure 120 so that the first enclosure 110 may be rotated around the rotation axis 132*a* in the θ2 direction.

Figure 5:
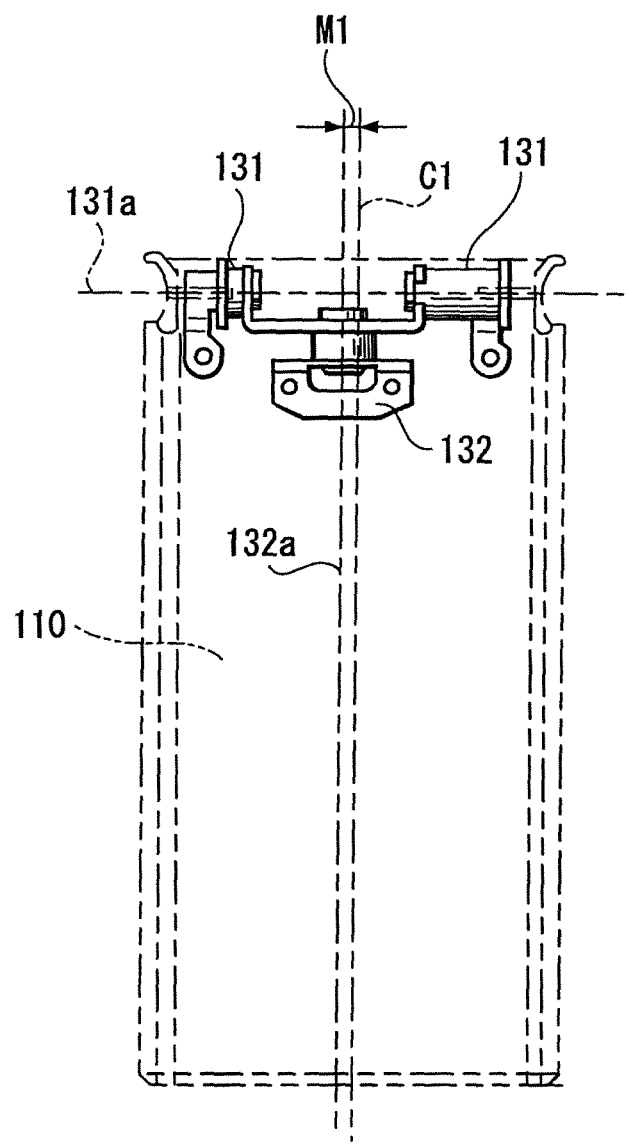
FIG. 5 is a front view showing a configuration example of a hinge according to an embodiment of the present invention.

FIG. 5 is a view showing a locating example of the rotation axis 132*a* of the second connection unit 132 of the hinge 130. FIG. 5 shows a state where the rotation axis 132*a* is provided as displaced by a predetermined amount M1 to outward from the center line C1 formed by uniting the center points of the short side of the first enclosure 110.

In arranging the portable terminal in this manner, as shown in FIG. 6A, in a state where the first enclosure 110 and the second enclosure 120 are folded with the display unit 111 of the first enclosure 110 directed outward, the first enclosure 110 is displaced in a direction indicated by an arrow A2 relative to the second enclosure 120 by a displacement amount M2 twice the displacement amount M1 in FIG. 5. The side surface S1 of the first enclosure 110 and the side surface S4 of the second enclosure 120 have an inclination angle as described above, respectively, and the inclination angle is adjusted to locate the inclination surfaces shown in FIG. 6A almost coplanar with each other. In contrast, as shown in FIG. 6B, the first enclosure 110 is connected to the second enclosure 120 without displacement when the first enclosure 110 and the second enclosure 120 are folded in a state where the display unit 111 of the first enclosure 110 and the operation unit 121 of the second enclosure 120 are stored inside.

FIG. 7 is a view showing an example of a state where the portable telephone terminal 100 is raised with the side surface S4 of the second enclosure 120 on the bottom. FIG. 7A is a view showing an example of a state where the first enclosure 110 and the second enclosure 120 are folded with the display unit 111 directed outward, and FIG. 7B is a view showing an example of a state where the first enclosure 110 and the second enclosure 120 are folded with the display unit 111 directed to inside.

In FIG. 7A, the first enclosure 110 is displaced in the direction indicated by the arrow A2 relative to the second enclosure 120, and hence a center of gravity G1 of the first enclosure 110 is low with an amount of the displacement. In FIG. 7B, since the first enclosure 110 is connected to the second enclosure 120 without displacement, a center of gravity G2 of the first enclosure 110 is higher than the center of gravity G1 of the first enclosure 110 in FIG. 7A. Thus, a rotation moment acting on a fulcrum F1 in an inclination direction B1 of the portable telephone terminal 100 in FIG. 7A is smaller than a rotation moment acting on a fulcrum F2 of the portable telephone terminal 100 shown in FIG. 7B. Therefore, the state shown in FIG. 7B is more stable.

FIG. 8 is a right front oblique view of the portable telephone terminal 100 shown in FIG. 7A. FIG. 8 shows a state where the display unit 111 is horizontally inclined at an angle shown as θ5 from a plane perpendicular to a locating plane. The angle shown as θ5 in FIG. 8 is an inclination angle provided on the side surface S1 of the first enclosure 110 or an inclination angle provided on the side surface S4 of the second enclosure 120.

Figure 9:
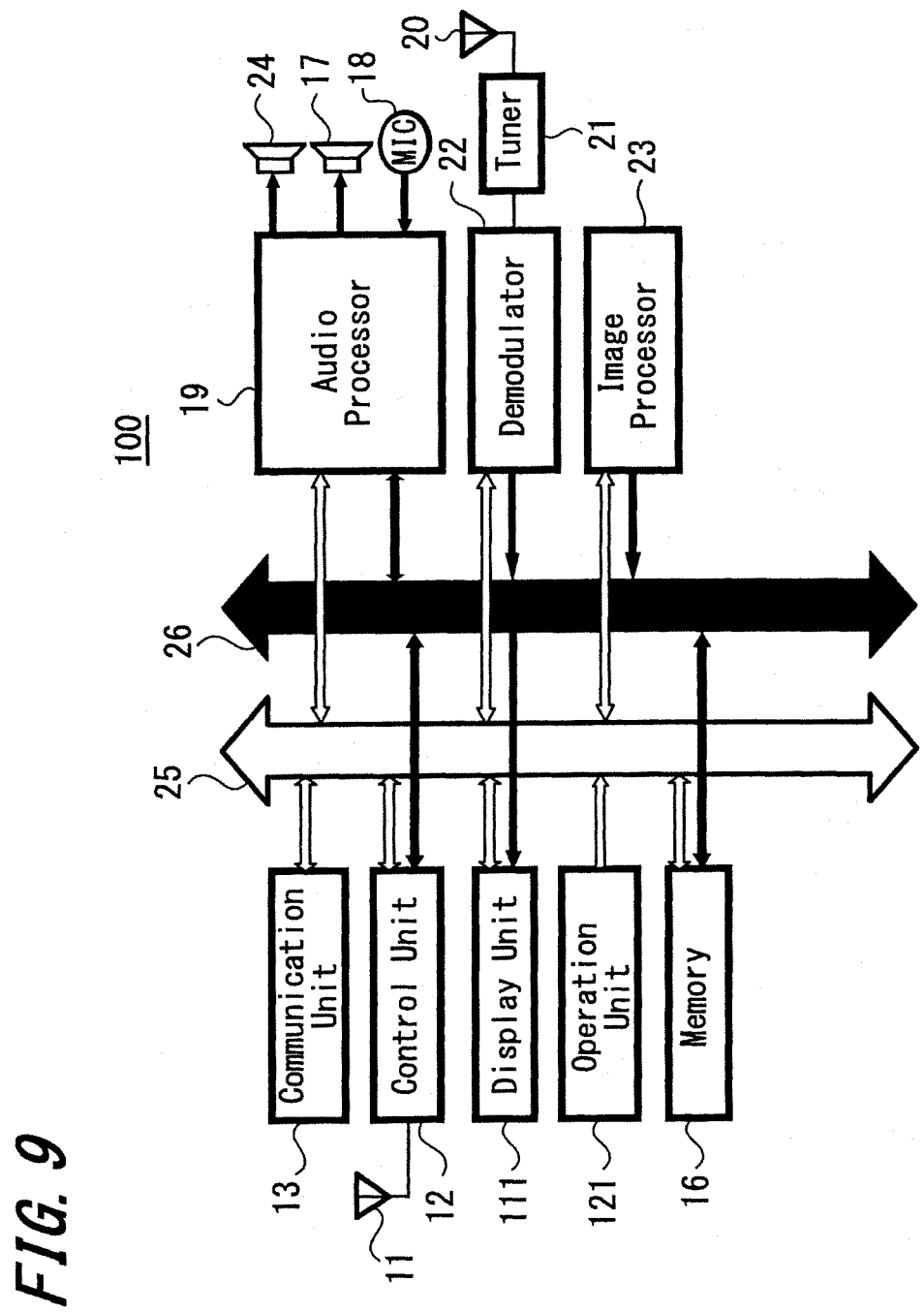
FIG. 9 is a block diagram showing an internal configuration example of a portable telephone terminal according to an embodiment of the present invention.

Next, an internal configuration example of the portable telephone terminal 100 of the present embodiment will be described with reference to FIG. 9. The portable telephone terminal 100 of the present embodiment has a radiotelephone communication antenna 11 to perform radiocommunication with a radiotelephone base station, and the antenna 11 is connected to a radiotelephone communication unit 12 and controlled by a control unit 13 to perform radiocommunication with a base station. When communication is performed for conversation in the communication unit 12, received voice data are supplied to and output from a speaker 17. The data are processed in a audio processor 19 for outputting the data from the speaker 17. Voice data picked up by a microphone 18 are supplied to and transmitted from the communication unit 12. Also in this transmission, voice processing is performed in the audio processor 19 to convert an input from the microphone 18 into transmission voice data. A later-described television speaker 23 to output television broadcast voice is also connected to the audio processor 19. Description of the display unit 111 and the operation unit 121 is omitted here, because the display unit 111 and the operation unit 121 are already described with reference to the configuration example of FIG. 2.

Each of these blocks in the portable telephone terminal 100 is connected to the control unit 13 or the like via a control line 25. Data may be transmitted via a data line 26, and data for use may be stored in a memory 16. The memory 16 includes a ROM (Read Only Memory), a RAM (Random Access Memory), or the like. The memory 16 stores a control program for the control unit 13 to control each unit and various initialization values, and is also used as a work area for the control unit 13 to perform various data processing. Apart from the memory 16, a hard disk drive used as a high-capacity data storage device may also be provided and used as part of a storage device.

The control unit 13 includes an arithmetic and control unit (processor) such as a CPU (Central Processing Unit), for example. The control unit 13 implements predetermined processing according to each computer program recorded in the memory 16 using the memory 16 as a work area for various processing to control each unit in the portable telephone terminal 100.

The portable telephone terminal 100 has an antenna 20 to receive radio waves from a television broadcasting station, and a tuner 21 to obtain broadcast signals of a particular channel from the radio waves obtained by the antenna 20, so that the portable telephone terminal 100 may receive television broadcasts. In the tuner 21, a channel is selected based on a command generated in the control unit 13 according to an operation input from the operation unit 121. Broadcast signals obtained in the tuner 21 are demodulated into image signals and voice signals in a demodulator 22.

Voice signals obtained in the demodulator 22 are supplied to the audio processor 19, are processed for speaker outputting in the audio processor, and are then output from the television speaker 24. Image signals obtained in the demodulator 22 are supplied to the image processor 23, subjected to various image corrections such as white balance correction and gamma correction in the image processor 23, and then displayed on the display unit 111. The portable telephone terminal 100 of the present embodiment may receive any of analog terrestrial television broadcasts and digital television broadcasts.

When the first enclosure 110 and the second enclosure 120 are folded with the display unit 111 directed to front and the portable telephone terminal 100 is raised on a desk or the like with the longitudinal side surfaces of the enclosures on the bottom as described above, television broadcasts may be watched at an easily viewable angle, because the portable telephone terminal 100 is inclined backward according to an inclination provided on the side surfaces of the enclosures.

When the first enclosure 110 and the second enclosure 120 are folded with the display unit 111 directed outward and the portable telephone terminal 100 is raised on a desk or the like with the longitudinal side surfaces of the enclosures on the bottom, the portable telephone terminal 100 may be placed in a stable manner, because a center of gravity of the first enclosure 110 is low.

Figure 10:
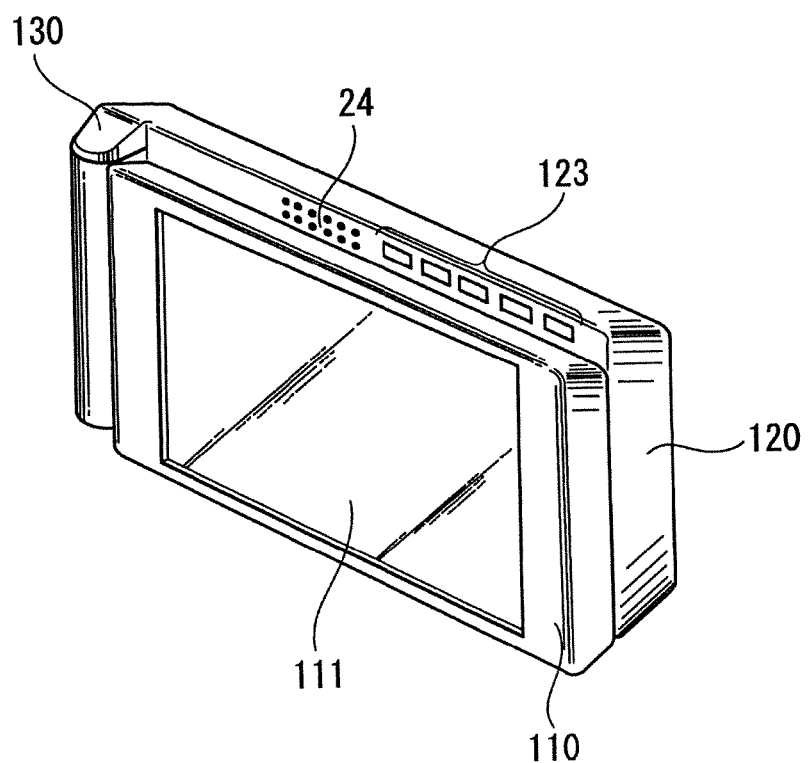
FIG. 10 is an oblique view showing a locating example of a portable telephone terminal according to another embodiment of the present invention.

The present embodiment is described above illustrating an example where operation keys to designate a television channel and control audio data are located as part of the operation unit 121 provided in the second enclosure. However, as shown in FIG. 10, such operation keys may be collectively located in a step portion formed by the first enclosure 110 and the second enclosure 120 folded with displacement. In FIG. 10, operation keys 123 to designate a channel and control voice and a speaker 24 for television broadcasts are located on an upper end of a second enclosure 120. In such a configuration, it may not be necessary for a user to open and close or rotate an enclosure when a channel or volume is changed during watching television broadcasts, and usability is improved.

In the aforementioned embodiment, a portable terminal is used as a portable telephone terminal; however, the portable terminal is not limited to a portable telephone terminal and may be widely used as any of various devices such as PDAs (Personal Digital Assistants) or portable game consoles having a function to receive television broadcasts and other devices having a similar function.

It should be understood by those skilled in the art that various modifications, combinations, sub-combinations and alterations may occur depending on design requirements and other factors insofar as they are within the scope of the appended claims or the equivalents thereof.

What is claimed is:

1. A portable terminal comprising:
   a first enclosure having a display unit,
   a second enclosure having an operation unit,
   a first connection unit foldably connecting the first enclosure to the second enclosure by being rotated around a first center axis, and
   a second connection unit connecting the first enclosure to the second enclosure and allowing the first enclosure to be rotated between a first position and a second position and around a second axis perpendicular to the first center axis, the second axis located in a position shifted by a predetermined amount from a line that is parallel to the second axis and is formed by uniting center points of first and second sides of the first enclosure that are perpendicular to the second axis and the line, wherein the first enclosure almost overlaps the second enclosure when the first enclosure and the second enclosure are folded via the first connection unit in a state where the first enclosure is rotated to the first position in the second connection unit, the first enclosure overlaps and is displaced from the second enclosure corresponding to the second center axis shifted by a predetermined amount when the first enclosure and the second enclosure are folded via the first connection unit in a state where the first enclosure is rotated to the second position in the second connection unit, the first enclosure and the second enclosure have side surfaces inclined at a predetermined angle that is non-parallel and non-perpendicular with respect to planar top and bottom surfaces of the first enclosure and the second enclosure, and the inclined side surfaces of the enclosures are located almost coplanar with each other when the first enclosure and the second enclosure are folded via the first connection unit in a state where the first enclosure is rotated to the first position in the second connection unit.

2. The portable terminal according to claim 1, wherein in a case where the inclined side surfaces of the first and second enclosures located almost coplanar with each other are mounted on a predetermined surface, a center-of-gravity position of the first enclosure and the second enclosure is shifted toward the predetermined surface from a center position when the enclosures are folded.

3. The portable terminal according to claim 1, wherein the first enclosure or the second enclosure incorporates a tuner to receive television broadcast signals.

4. The portable terminal according to claim 1, further comprising:
a television operation unit configured to operate the tuner to receive television broadcast signals, wherein
the television operation unit is located in a step portion formed between one side surface of the first enclosure and one side surface of the second enclosure in a case where the other side surface of the first enclosure and the other side surface of the second enclosure are located almost coplanar with each other.

5. The portable terminal according to claim 3, further comprising:
a speaker configured to output voice received by the tuner, wherein
the speaker is located in a step portion between one side surface of the first enclosure and one side surface of the second enclosure in a case where the other side surface of the first enclosure and the other side surface of the second enclosure are located almost coplanar with each other.

* * * * *